Patented Dec. 23, 1941

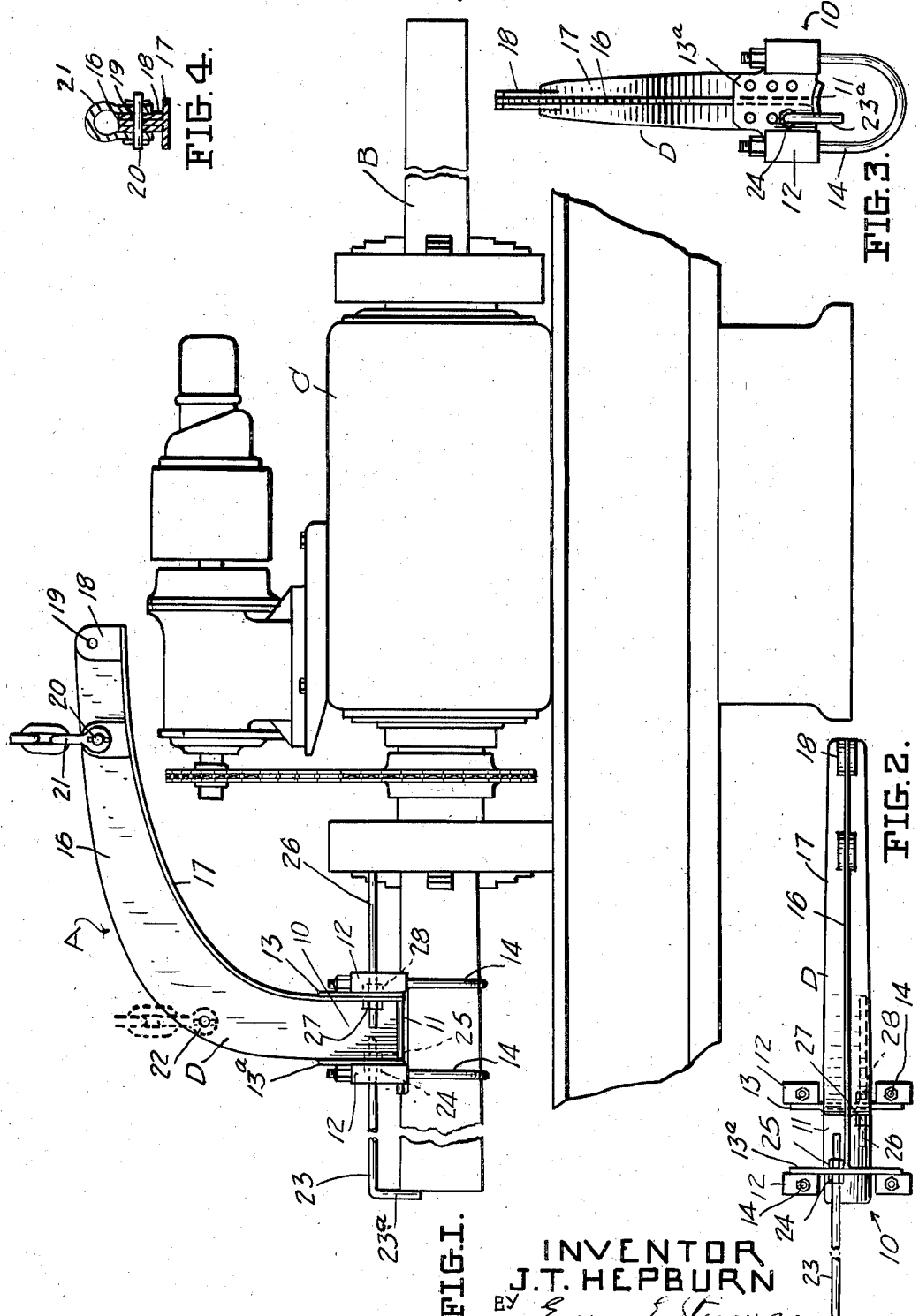

2,267,352

UNITED STATES PATENT OFFICE 2,267,352

DEVICE FOR LOADING ELONGATED ARTICLES INTO LATHES AND THE LIKE

John T. Hepburn, Toronto, Ontario, Canada

Application May 31, 1941, Serial No. 396,133

6 Claims. (Cl. 294—67)

This invention relates to a device for loading elongated articles into lathes and the like.

The device according to the present invention is designed particularly for use in shops for loading heavy gun barrels, shafting or the like, into lathes or other machinery. In the following description it will be described in relation to the loading of gun barrels in lathes.

Up to the present time the loading of gun barrels in lathes and the like has involved cumbersome operations which involve a considerable difficulty and time. It is usual to lift the barrels by means of chains and block and tackle and to shift the lifting means several times in the loading operation to urge the barrel into final position. Once loaded, the several shifting operations are necessary to get the barrel positioned accurately with respect to the chuck of the lathe and machining tools. This naturally takes time in varying amounts as it really involves a cumbersome hit and miss method of loading.

It is an object of the present invention to avoid the disadvantages of this prior method and to provide a device through which gun barrels and similar elongated objects may be loaded onto a mounting or into machinery and the like in a simple and efficient manner.

A further object of the invention is to provide a simple device of the character specified which can be manufactured economically and manipulated easily.

A further object of the invention is to provide a device of this character which includes means for locating it on the elongated article so as to lift the article in a balanced manner.

A still further object of the present invention is to provide a device of the character specified which will locate the article accurately in respect to its proposed mounting in one simple operation.

With these and other objects in view the invention in general comprises a loading unit having a base with means for connecting the base to the article to be loaded and a superstructure rising from the base offset to extend over the article to be loaded and spaced therefrom, the superstructure being designed to connect with a lifting device at a point in advance of the base. Preferably the unit includes a means for locating it on the article to be loaded at a predetermined position and also preferably includes a means for locating it accurately in respect to its proposed mounting as the article is initially disposed on its mounting.

The invention will be clearly understood by reference to the following detailed specification taken in conjunction with the accompanying drawing.

In the drawing:

Fig. 1 is a side elevation of the loading device shown in the act of mounting a gun barrel in a lathe, a portion of the lathe being shown fragmentarily in side elevation.

Fig. 2 is a top plan view of the loading device.

Fig. 3 is an end elevation of the loading device, and

Fig. 4 is a detailed section, showing a form of shackle which may be applied to the loading device or connecting with the hook of a crane or other lifting device.

Referring to the drawing, A indicates the loading device as a whole which may be employed for lifting and loading elongated objects such as a gun barrel B to dispose such articles in mounted position in a required mounting such as a lathe C.

The loading device A takes the form of a unit having a base 10 which preferably includes a bearing plate or saddle 11 (Fig. 3) designed to bear upon the article to be loaded, such as the gun barrel B. The base may also include, though not necessarily, integrally connected socket members 12 disposed on each side of the unit and connected thereto by plates 13 and 13ª welded to the unit. The sockets of the embodiment of the invention shown are designed to receive the free ends of the clevises 14. The latter, of course, are designed to extend around the gun barrel B or other article to be loaded so as to fasten the loading unit on it. Any suitable form of clamping means, of course, may be employed.

Rising from the base 10 is a superstructure D which preferably takes the form of a unitary arm offset to extend over the article to be loaded, the offset portion being spaced vertically from the article to be loaded such that the superstructure may clear the projecting parts of the mounting into which the article is to be loaded, as shown in Fig. 1. The superstructure mounted on the gun barrel readily clears the superstructure of the lathe C so that the gun barrel can be loaded into it in a simple operation.

The unitary arm in the illustrated embodiment of the invention which forms the superstructure D is conveniently of T cross section more clearly illustrated in Fig. 4, being made up of a main fin 16 and a reinforcing cross plate 17 which may be welded to the latter. At the extreme end of the fin 16 and also at a point inwardly of the end of the fin, if desired, the latter is formed with a reinforced, thickened area 18, which may be provided by welding plates to each side of the fin at the point in question. At this point or at the points in question, if more than one reinforced area is provided an orifice 19 is provided through which the pin 20 of a suitable shackle 21 may be projected in order to secure the shackle on the loading arm. The shackle is designed to connect with the hook or other member of a suitable lifting device. The arm or superstructure D is also orificed preferably above the base 10 as indicated at 22 to receive a suitable fitting whereby the loading unit may also be lifted.

When being moved to be applied to the gun barrel or other article to be loaded, the loading unit is lifted from the fitting connected through orifice 22 through which the loading unit will be balanced when lifted and thus be disposed in substantially the normal position which will permit easy and ready application of the unit to the article. Usually the lifting point when the loading unit is attached to the article will be at the extreme end of the offset portion where the orifice 19 is located, as shown in Fig. 1. The loading unit is so constructed that when lifting it together with the article to which it is attached the latter will substantially balance and be disposed in a horizontal position, but if desired a second lifting point may be employed as previously referred to, to be used in conjunction with articles of less length or weight so that they may be lifted in a similar manner.

The loading unit preferably includes a means for locating it at a point on the article to be lifted so that it may be lifted in a substantially balanced manner and preferably also includes a means for locating the article accurately with respect to its mounting so that it does not have to be shifted after it is initially mounted to place it in the desired position. A simple practical means for locating the loading unit on the article is shown in Figs. 1, 2 and 3. This takes the form of a rod 23 projected from the base 10 and in the illustrated embodiment of the invention mounted in the plate 13ª and secured by the nuts 24 and 25. The free end of the rod 23 is bent downwardly and at right angles as at 23ª, so that it may overlap the end of the gun barrel B or other article. Thus by adjusting the rod axially through the plate 13ª the distance from the end of the gun barrel or other article to the point where the loading unit may be positioned is automatically gauged. Thus, in the loading of a series of gun barrels of given specifications the loading device is quickly and accurately positioned on them. Adjustment to suit other articles is, of course, easily effected.

A practical form of means for locating the gun barrel or other article in its mounting may take the form of a rod 26 projected through the plate 13 and adjustably fastened by the nuts 27 and 28. The rod 26 projects forwardly of the base 10 and as shown in Fig. 1 is designed to abut an exterior surface of the chuck of the lathe so that as the gun barrel is projected into the chuck of the lathe in a simple and smooth operation, it is automatically positioned in the lathe when the end of the rod 26 comes in contact with the said exterior surface of the chuck. In this case, as in the case of the rod 23, when working with a series of gun barrels of the same specifications, such barrels may be loaded accurately in quick order as required. On the other hand, adjustment of the rod 26 will readily provide for adapting the loading unit to handle articles of different specifications.

In use the loading unit is easily manipulated. It is readily raised by a crane or other lifting device from the point 22 and swung over the end of the gun barrel B where it is immediately located at the proper point when the angular extension 25 of rod 23 contacts the end of the barrel. The clevises 14 are then securely tightened around the barrel to mount the loading unit rigidly whereupon the lifting device is then connected to the point of lifting on the offset portion of the unit or to the appropriate one of said points on the offset portion if more than one is provided and the loading unit and the gun barrel to which it is attached is then lifted. In this lifting operation the gun barrel will be placed so that it will be disposed in a substantially horizontal position and by swinging the barrel horizontally and locating it in the receiving mouth of the chuck of the lathe such barrel may be readily projected into the chuck to the point required which is automatically determined when the end of the road 26 contacts the exterior surface of the chuck. During this loading operation the offset portion of the loading unit spaced from the barrel readily clears the superstructure of the lathe so that the barrel is thus mounted in a minimum of time through a very simple operation.

While the preferred form of loading device has been illustrated it is, of course, apparent that this might be varied in structure and fittings to a considerable extent.

What I claim as my invention is:

1. The device for loading elongated articles onto lathes or the like comprising a loading unit having a base, means for connecting the base to the article to be loaded, a superstructure rising from the base offset to extend over, and spaced from, the article to be loaded and means in connection with said unit for locating it upon the article to be loaded.

2. The device as claimed in claim 1 including means in connection with the unit for locating a carried article in predetermined position with respect to the lathe or the like as said article is being loaded.

3. The device for loading elongated articles onto lathes or the like comprising a loading unit having a base, means for connecting the base to the article to be loaded, a superstructure rising from the base offset to extend over, and spaced from, the article to be loaded, and means in connection with said unit for locating a carried article in predetermined position with respect to the lathe or such like, when the article is being loaded.

4. The device as claimed in claim 1 in which the means for locating the unit on the article to be loaded comprises a member projected from the unit engageable with the article.

5. The device as claimed in claim 1 in which the means for locating said unit on the article comprises a member projecting from the unit, having means projecting into the path of the article and engageable with the end of the article.

6. The device as claimed in claim 3 in which the means for locating the article with respect to the lathe or the like comprises a member projecting from the base below the superstructure engageable with said lathe or the like.

JOHN T. HEPBURN.